United States Patent [19]

Wells

[11] 4,267,488
[45] * May 12, 1981

[54] CONTAINMENT OF PLASMAS AT THERMONUCLEAR TEMPERATURES

[75] Inventor: Daniel R. Wells, Miami, Fla.

[73] Assignee: Trisops, Inc., Austin, Tex.

[*] Notice: The portion of the term of this patent subsequent to Jan. 10, 1995, has been disclaimed.

[21] Appl. No.: 1,276

[22] Filed: Jan. 5, 1979

[51] Int. Cl.³ .............................................. G21B 1/00
[52] U.S. Cl. ................................... 315/111.7; 176/3; 315/111.2; 315/111.4
[58] Field of Search ......................... 315/111.1–111.9; 176/1–4

[56] References Cited

U.S. PATENT DOCUMENTS 4,068,147  1/1978  Wells .................................. 315/111.4

Primary Examiner—Eugene R. LaRoche
Attorney, Agent, or Firm—Browdy and Neimark

[57] ABSTRACT

A method and apparatus for heating and compressing plasma. The plasma is injected into a vacuum chamber located within a primary containment magnetic field. The injected plasma is inductively energized by means coaxial with and contained in the primary magnetic field to generate ringlike toroidal plasma vortex structures moving toward collision with each other in the chamber along an axis extending in a direction parallel to the primary containment magnetic field. The plasmoids are additionally compressed as they approach collision, also by means coaxial with and contained in the primary containment magnetic field. The toroidal plasma structures collide inside the primary magnetic field of bottle. The interaction caused by the collision generates a "septum region" consisting of a magnetic barrier which serves to separate the two colliding ring structures and keeps them from interacting destructively. The septum barrier also serves as a screen which allows collision of fast ions at the center of the region between the structures, while the electrons follow the magnetic force lines of the barrier and are shunted back into the structures.

17 Claims, 5 Drawing Figures

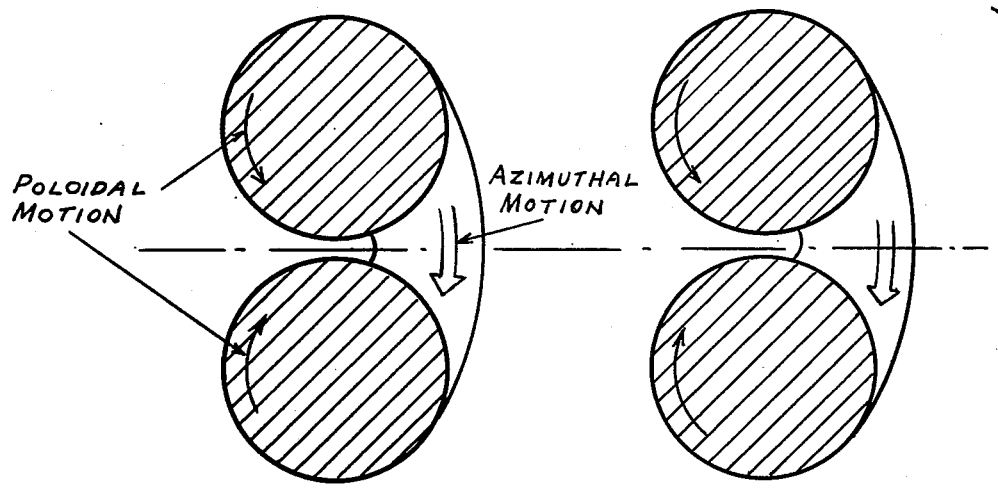
(a) OBSERVED PLASMA MOTION
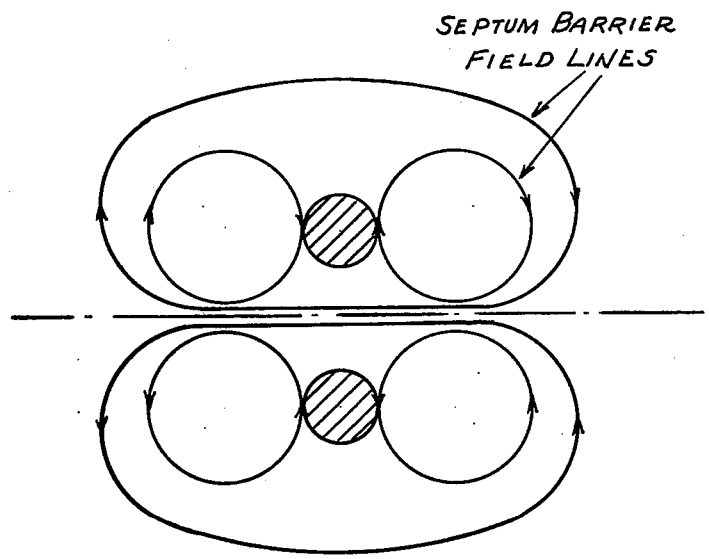
(b) A SUGGESTED VORTEX CONFIGURATION FITTING THE OBSERVED POLOIDAL MOTION FOR EACH VORTEX OF (a)
FIG. 5

4,267,488

CONTAINMENT OF PLASMAS AT THERMONUCLEAR TEMPERATURES

FIELD OF THE INVENTION

This invention relates to systems for generating electrical energy by thermonuclear processes, and in particular to methods and apparatus for the containment, heating and interaction of plasmas in thermonuclear fusion reactors.

BACKGROUND OF THE INVENTION

There are multi-faceted problems that arise in the containment of plasmas at thermonuclear temperatures in fusion reactors. For the adequate containment of plasmas at thermonuclear temperatures and densities, an improved method and plasma flow matrix or structure are needed, and there is also needed an improved method, with appropriate apparatus, for the production of the flow and field matrix associated therewith.

There currently exists a general need for new techniques for the construction of power generating stations, large and small, which will be of a design that allows them to be economically competitive with other power sources.

The state-of-the-art technology is not adequate to provide the desired new conditions. The various previously proposed methods or apparatus designs are unsatisfactory either because they are excessively expensive or represent excessively cumbersome solutions to the basic problem of nuclear containment. The present invention aims to provide the proper general solution to the problem and to specifically provide various practical methods and means for the production of a unique flow matrix which will accomplish the basic purpose of providing an efficient, economical and practical thermonuclear design.

SUMMARY OF THE INVENTION

The present invention is based on a realization of an exclusively unique field and flow structure or flow, magnetic field matrix which is important to accomplish the design and construction of a practical and economical thermonuclear reactor superior to those of the prior art.

A determination of the required flow, magnetic field matrix can be accomplished by determining what structure corresponds to a closed configuration of magnetic fields and flows that possesses the minimum thermodynamic free energy for the given boundary and initial conditions imposed on the structure. Specifically, the well known mathematical method of Hamilton and Jacobi can be used to find that set of Euler-Lagrange partial differential equations, which, with the imposition of the appropriate boundary and initial conditions, describes the internal and external flow corresponding to minimum thermodynamic free energy. The resulting structure defined by these equations is a naturally-occurring stable plasma structure which will form if the plasma is allowed to self-order, that is, the proper stable minimum free energy state will automatically be obtained if no external interference is deliberately imposed on the system by the designer. This naturally-occurring self-ordered state is inherently more stable than, and has other major advantages, to be described below, over any other solutions to this problem.

Detailed mathematical methods employed to obtain the prescription of the flow structure are given in an article by Rund and Wells, soon to be published in the "Journal of Plasma Physics", including the appended excerpt, hereby incorporated by reference.

An outline of the method is as follows:

The introduction of Clebsch representations allows one to formulate the problem of finding minimum energy solutions for a magneto-fluid as a well-posed problem in the calculus of variations of multiple integrals. When the latter is subjected to integral constraints, the Euler-Lagrange equations of the resulting isoperimetric problem imply that the fluid velocities are collinear with the magnetic field. If, in particular, one constraint is abolished, Alfven velocities are obtained. In view of the idealized nature of the model treated here, further investigations of more sophisticated structures by means of Clebsch representations may be expected. Preliminary results of a similar calculation utilizing a modified two-fluid model are discussed in the appended excerpt.*

*"Clebsch representations in theory of minimum energy equilibrium solutions in magnetohydrodynamics" by Rund, Wells and Hawkins.

Reference is also made to my already issued U.S. Pat. No. 4,068,147 of Jan. 10, 1978, which discloses a species of the present invention.

Plasma in any device designed for the purpose of attaining confinement of a thermonuclear plasma will automatically seek to arrange itself into a preferred thermodynamic state. If the design interferes with this process by utilizing conventional vacuum magnetic fields and flow, and magnetic field containment, the plasma, in attempting to attain the proper state, will appear, in a conventional machine, to go unstable. All gross magnetohydrodynamic instabilities observed in conventional devices of the pinch, Stellerator, Tokamak, Astron, reverse field pinch, inertial confinement, Z-pinch, and all mirror devices other than the TRISOPS design (U.S. Pat. No. 4,068,147) are due to the fact that the plasma in these machines is attempting to reach the lowest energy state, and in the attempt moves into the vacuum chamber walls.

The stable-flow field matrix herein described is very easy to heat to the thermonuclear temperatures by various simple adiabatic compression and/or energy injection techniques of various known types. This fundamental flow matrix has other substantial advantages over any other magnetic field and/or flow configuration in that the resulting low free energy structure is not only more stable than any other structure obtainable by methods known in the art, but that it is more easily heated to high temperatures, does not radiate bremsstrahlung or synchrotron radiation in any appreciable amounts, and is relatively unaffected by plasma impurities. This, in turn, allows the hot reacting gas to be spiked with heavy elements, such as argon, which further stabilizes the structure. The resulting closed plasma structure may or may not reverse the vacuum confining field, but in either case is a closed configuration; the structure is easy to produce, allowing simplicity of reactor design for small or large reactors; the naturally-occurring stable structure self-orders in such a way that hydrodynamic forces assist in the support of the localized high pressures generated by the thermonuclear plasma and thus reduces the energy required to produce the associated confining and compressing or heating externally-applied magnetic fields.

Also, in the present invention there are two principal types of ring structures which are mirror images of each other. This allows the two types of rings to interact with each other and bring each other to a stationary position so that further heating of the structure can be accomplished. The basic low-energy, force-free collinear structure described herein can uniquely accomplish this interaction and consequent stationary geometry.

The plasma rings themselves may or may not have an appreciable amount of their self-contained energy in the form of thermal energy. A large proportion of their energy may be in the form of kinetic energy of mass motion of heavy positively charged ions. This may be true before and after heating by compression or by other means known in the art, such as by neutral injection, by R. F. fields, or the like. As the structures are pumped to higher mass flow velocities by these means and methods, the circulating mass flow associated with the ring structures is "peeled off" and the resulting mass flow produces head-on collision of the fast positive ions at the center of the region between two ring structures, with resulting fusion of the colliding streams of nuclei. Structures with most of their energy in the form of mass flow energy can be contained and compressed by hydrodynamic forces, thus greatly reducing the magnetic compression field strength required simply to guide the flow fields. The colliding streams of nuclei that are fusing may or may not escape from the confining matrix of flow and magnetic fields, but since the "peel off" process is continuous until the rings are completely consumed, this secondary confinement may play a minor role in the overall confinement scheme.

In the event that most of the energy pumped into the rings by compression or other heating methods is in the form of thermal energy rather than energy of mass motion, several very important advantages over conventional approaches immediately become evident. The plasma rings, under some conditions, consist of large rings each containing several smaller rings which circulate about inside it. This composite flow matrix is such that large hydrodynamic magnus forces are produced which help in the containment of the very high pressure gas inside the rings. This, in turn, reduces the energy required to produce the magnetic fields necessary for containment. The containment energy is derived from the coils that produce the composite vortex itself, which greatly increases the efficiency of the overall confinement scheme.

Another advantage of the composite nature of the flow structure is that the interaction of the composite plasma rings pumps cold plasma and neutral gas into the matrix. As the cold electrons in the rings are heated by the very hot heavy ions, they immediately transfer their energy to the cold plasma which has been pumped into the rings. This keeps the electrons cold during the whole time that the fusion process is in progress and thus prevents the production of bremsstrahlung (X-rays). Thus, the energy that would be lost to X-ray emission is employed instead in effectively heating the plasma to even higher temperatures. The fact that the electrons remain cold means that impurity radiation losses are also reduced to zero and that there is no need to resort to complex gettering systems and other means of reducing impurities in the discharge.

Accordingly, a principal object of the invention is to provide a new and improved method of producing a stable plasma flow configuration or matrix in a nuclear device that is more easily produced and provides more stable structure than is obtainable by previous methods of magnetic and/or inertial confinement.

Another object of the invention is to provide a unique solution to the geometry of thermonuclear devices.

A still further object of the invention is to provide in a nuclear device the magnetic field and mass flow field organization necessary to produce the unique minimum free energy state in an enclosure confining thermonuclear plasma.

A still further object of the invention is to provide a method and means defining a unique solution to the problem of obtaining the most efficient heating and/or compressing of a plasma to thermonuclear temperatures.

A still further object of the invention is to provide a method and means for obtaining the most efficient, most stable and simplest geometry of plasma flows and magnetic fields for the containment of thermonuclear plasmas, these special flows and fields allowing both electromagnetic and hydromagnetic containment and also preventing heating of the electrons and accompanying generation of X-rays.

Yet another object is to provide for improved control of thermonuclear fusion reactions to provide utilizable energy.

BRIEF DESCRIPTION OF THE DRAWINGS

Further objects and advantages of the invention will become apparent from the following description and claims, and from the accompanying drawings, wherein:

FIGS. 5a and 5b are diagrammatic sectional views obtained from a composite vortex ring structure which allows hydromagnetic as well as electromagnetic confinement of the hot reacting plasmas in accordance with the present invention.

DESCRIPTION OF PREFERRED EMBODIMENTS

Thermonuclear devices of the same general type as that with which the present invention is concerned have commonly employed various specific means for heating and compressing plasmas to thermonuclear temperatures. However, difficulties have been encountered in the past in attaining efficient heating and containment of the plasmas because of inherent instabilities in the resulting plasma configurations. Thus, in these prior machines attempts to heat and maintain the plasma become difficult, and even in instances where conventional designs have achieved sufficient densities and temperatures to have a positive energy balance the machine is clumsy, inefficient, and subject to erratic operation. In contrast, in a device according to the present invention the device has the unique magnetic field and flow structure required for an efficient reactor design which is not subject to gross instabilities, which is simple to fabricate, and which is easily maintained.

The basic method of obtaining a partial differential equation, which when solved subject to boundary conditions appropriate to the machine geometry utilized to give a detailed description of the required field and flow conditions, can be ascertained by standard Hamilton-Jacobi techniques. In this mathematical procedure, the total energy of a closed plasma volume is varied subject to a set of constant integrals which are determined by the physics of the reactor. The resulting equations are the required description. The practical attainment of the unique structure is easily accomplished by any one of several different machine geometries, involving several respectively different methods of plasma production and heating.

Figure 1:
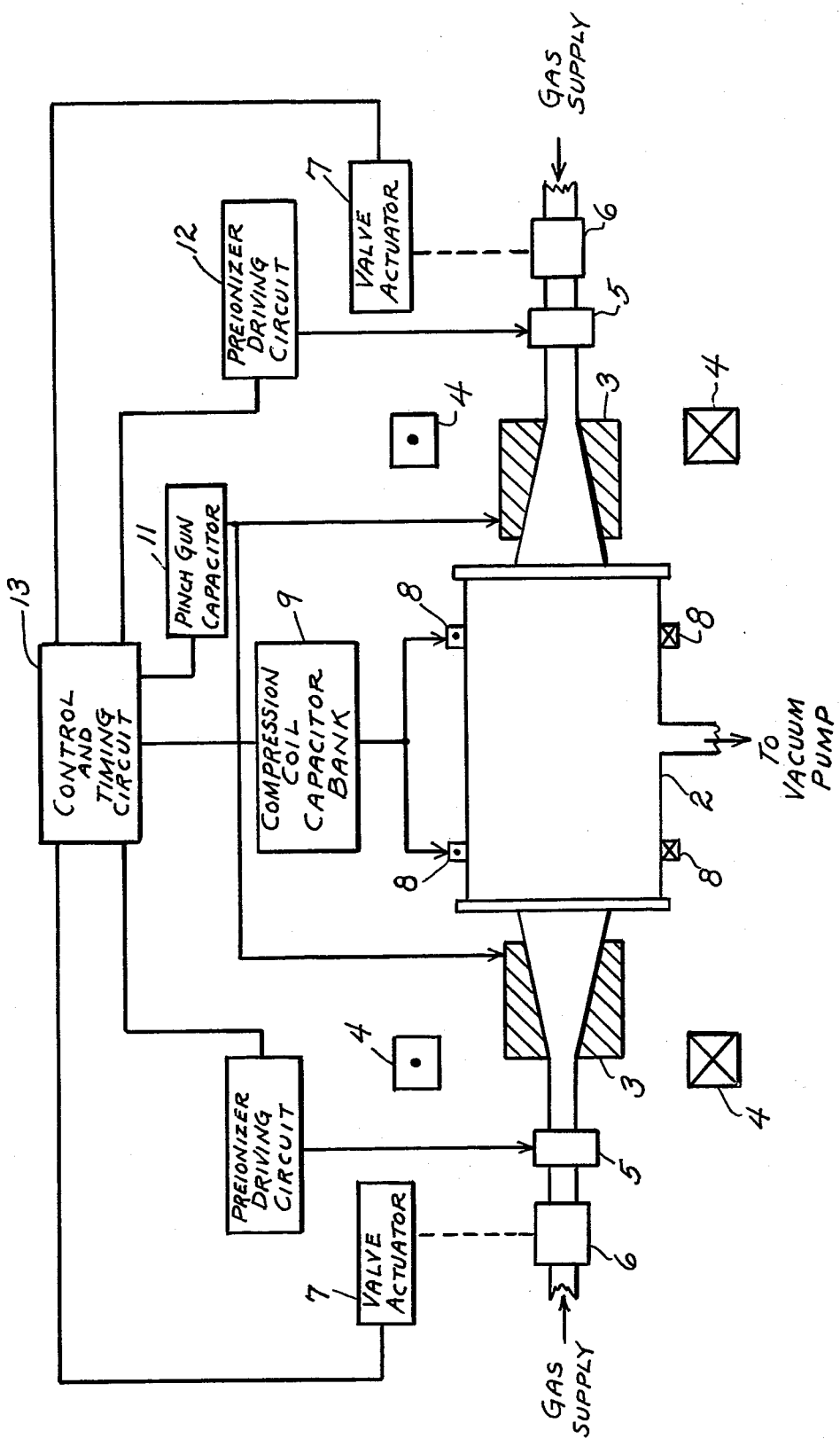
FIG. 1 is a schematic diagram illustrating a coaxial theta pinch gun thermonuclear system with a machine and ring geometry which can attain and utilize a unique plasma matrix in accordance with the present invention.

One possible apparatus designed to give effect to this technique is illustrated in FIG. 1, which discloses an apparatus similar to that described in U.S. Pat. No. 4,068,147. This particular apparatus, however, is not the only apparatus which can accomplish the purpose of the present invention. Any specific machine geometry which results in the lowest free energy solution will suffice to produce the unique state described herein. Other potential geometries for generating this unique state are illustrated in FIGS. 2, 3, 4 and 5a, 5b of the drawings. Any apparatus which produces this unique state generates and utilizes a plasma configuration in which plasma flow is predominantly parallel to magnetic fields trapped within the structure, which, in turn, stabilizes the structure. The structures are also characterized by the fact that the conduction currents, magnetic induction fields, mass flow velocity fields, and vorticity fields are all mutually parallel or anti-parallel. These structures can be embodied in the form of a theta pinch reactor device, a conical theta pinch reactor device, a coaxial gun reactor device, and/or a reactor device employing ring currents flowing through rigid conductors of any shape or geometry. In such devices according to the present invention, the pinch coils and/or rings must be located inside of and surrounded by the magnetic field of the associated magnetic containment configuration. If the plasma structures are generated, by any of the devices described above, outside the magnetic containment bottle and then an attempt is made to force the plasma structure into the bottle, the structure will disintegrate and the uniquely stable structure described above will not be formed. Once the plasma structure has been generated within the bottle, various techniques can be used to further heat and compress it if it is not already at a thermonuclear temperature. These auxiliary heating and compression methods and means can be any or all of those well known in the art.

In FIG. 1, the containment vessel is the vacuum chamber 2. The mirror coils 4 provide the primary containment magnetic field within the vacuum chamber, the plasma source is the gas supply line including the preionizer 5, the gas injection means is the vacuum pump connected to the chamber 2, the means forming the plasmoid rings and urging them toward collision along an axis extending parallel to the trapped containment magnetic field in the chamber are the pinch coils 3, and the means to further compress and heat the colliding plasmoids to further elevate the plasma temperature are the secondary magnetic mirror coils 8. The plasmoid-forming and collision-urging means 3 are located inside of and are surrounded by the associated containment magnetic field provided by the primary mirror coils 4.

Figure 2:
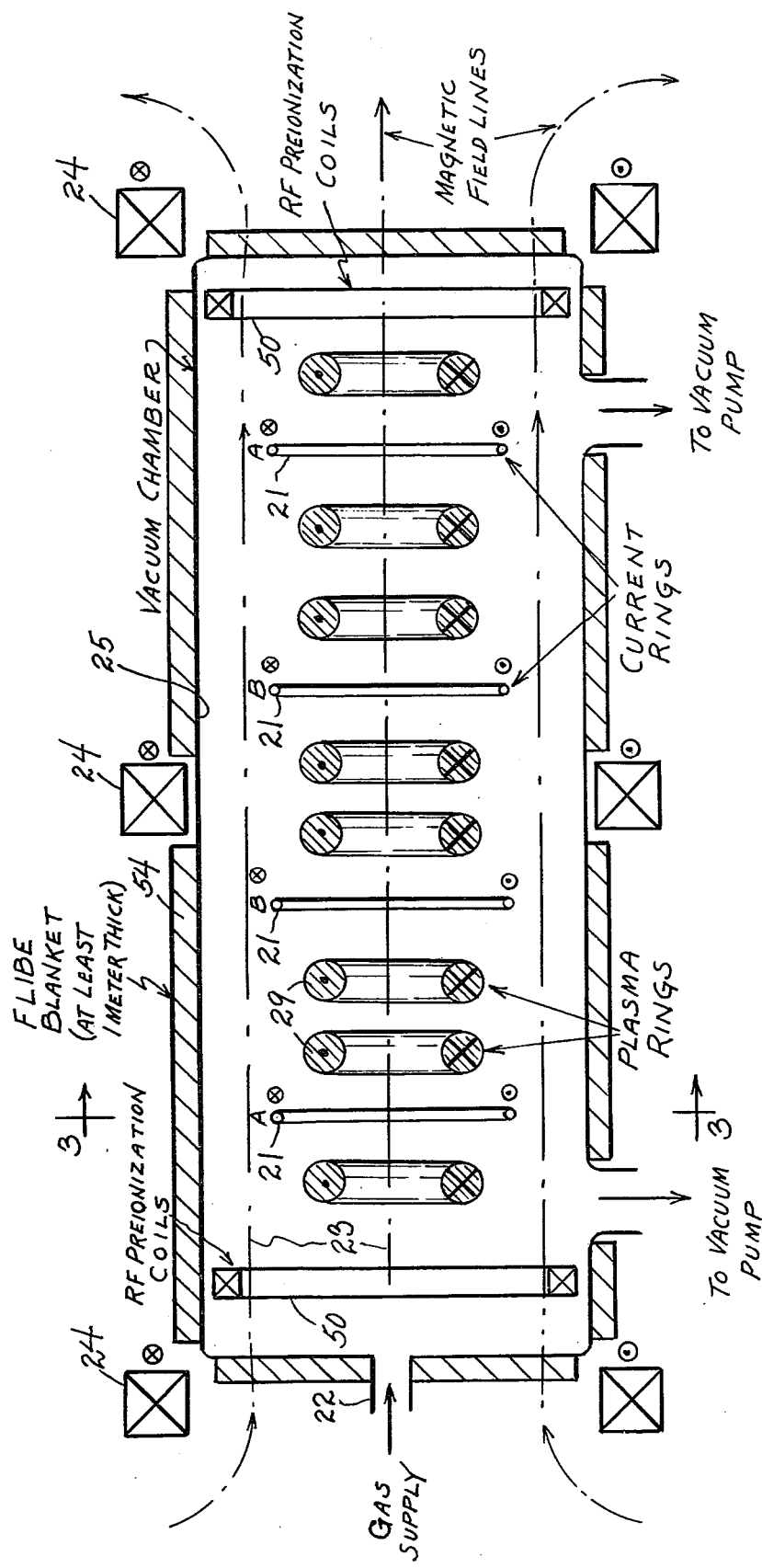
FIG. 2 is a diagrammatic illustration of another thermonuclear system with a geometry for generating a unique plasma matrix in accordance with the present invention.
Figure 3:
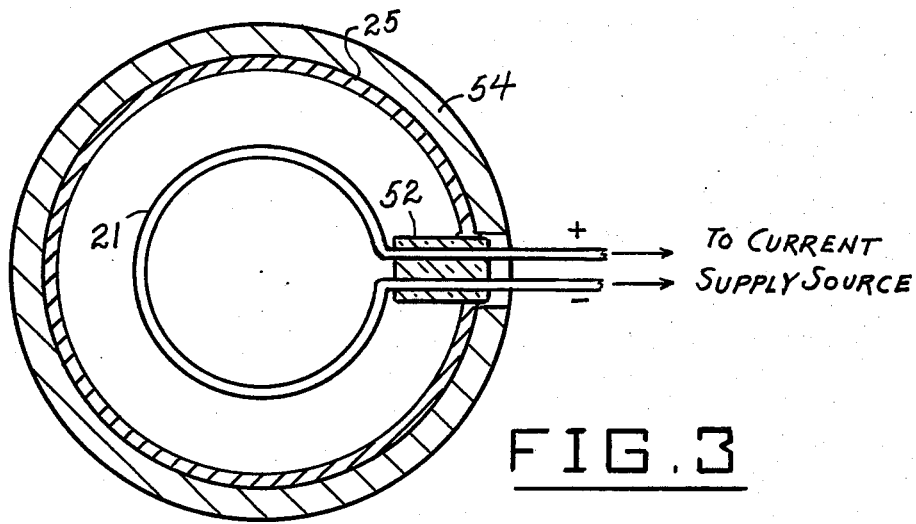
FIG. 3 is a transverse vertical cross-sectional detail view taken substantially through a system of FIG. 2, substantially on the line 3—3 thereof.

In the embodiment shown in FIG. 2, a vacuum chamber 25 is mounted axially in the field 23 of a plurality of primary coaxial containment coils 24 and receives neutral gas at one end through an inlet conduit 22, said gas being ionized inside the chamber by suitable ionizing means 50. A set of electrical current-carrying rings 21 generate plasma ring structures 29 by producing shear in the surrounding magnetic field 23 and surrounding ionized gas which fills the region of the rings, the ionized gas being contained by the vacuum chamber 25. The stable plasma ring structures are produced by the current-carrying rings 21. As above mentioned, the function performed by the current-carrying rings 21 can be also performed by theta pinch coils, as in FIG. 1, or by coaxial guns, conventional theta pinches, electron or proton guns, or the like. It is important only that the resulting plasma structures or matrices 29 have internal fields and flows corresponding to the lowest thermodynamic free energy state, as described above. It is also essential that the current-carrying rings be placed inside the field of the magnetic bottle containing the field 23 generated by the field coils 24. The current-carrying rings 21 are also employed to heat the plasma structures by additional compression after the plasma rings 29 have been formed. Other means, known in the art, for additionally heating the plasma rings may also be employed.

Thus, in the apparatus of FIG. 2, the currents in the current rings 21 all have the same polarity, as marked. The currents in the guide field coils 24 are also in the same direction as the currents in the rings 21. The current rings 21 can be connected in parallel to a suitable source, but the parallel connections are not necessary as long as the currents in the rings 21 are all in the same direction. For example, the currents in the rings 21 may be programmed in a particular sequence in order to produce plasma rings 29 in a desired programmed sequence. The currents in the rings 21 must all have the same polarity, which is opposite to the net toroidal current in each plasma ring.

The vacuum chamber 25 may be constructed of glass, ceramic, stainless steel, or some other suitable refractory material. A refractory metal is preferable, although not positively necessary in all possible configurations. The ring supports, shown at 52, should be of ceramic or other suitable material, but in some circumstances with proper insulation, may comprise a refractory metal. It is to be understood that while the current rings 21 are shown inside the vacuum chamber 25 in FIG. 2, they may also be located outside the vacuum chamber, or with some inside and some outside. The current rings may be in the form indicated in FIG. 2, but in place thereof may be employed conical theta pinches, ordinary theta pinches, or the like. These rings may serve the same purpose as both the conical pinch coils 3 and the compression coils 8 of the embodiment of FIG. 1.

By the use of appropriate programming of the currents in rings 21, the rings shown at A may be employed to form the plasma rings and the rings shown at B may be employed to then compress said plasma rings. By having at least six rings 21 instead of four as shown in FIG. 2, a continuous sequence of rings may be utilized.

After, say, four events, the gas may be pumped out and renewed.

The arrangement of FIG. 2 corresponds to a set of TRISOPS (FIG. 1) devices in parallel in one vacuum chamber. There are a large number of possible variations of this scheme.

Unless some form of direct conversion is employed, a lithium or FLIBE blanket 54 is used to surround the device to convert the kinetic energy of the neutrons produced by the thermonuclear energy within the chamber 25 into heat energy.

The gas enters the vacuum chamber 25 at inlet conduit 22 as neutral gas and is then preionized inside the chamber by any suitable means known in the art. This means may comprise a set of radio frequency coils, microwaves, a suitable arc discharge, or the like. In FIG. 2 a set of R.F. coils 50, 50 are shown for this purpose, merely by way of example, but any suitable alternative ionizing means may be employed depending upon the particular configuration which is chosen.

The field coils 24 are arranged to guide the plasma rings in either direction. The plasma rings 29 moving parallel to and in the same direction as the field lines 23 are called "contra-rotational". Those moving against the magnetic field direction are called "co-rotational". The "contra-rotational" plasma ring structures have their magnetic fields and velocity fields anti-parallel. The "co-rotational" plasma ring structures have their magnetic and velocity fields parallel. It is when these two types of plasma rings meet that the interaction takes place which heats the plasma to thermonuclear temperatures. Each set of plasma rings 29, 29 in FIG. 2 are respectively co- and contra-rotational. The net currents in toroidal directions are as shown in FIG. 2. When the two rings 29, 29 of the set meet, they stand still in the laboratory frame and form the magnetic wall shown in FIG. 4 (septum field). They can then be heated to very high temperatures by any means well known to the state of the art, such as secondary magnetic compression, neutral injection, magnetic pumping, ion cyclotron heating, or the like. They may have enough energy already by virtue of the formation of current rings so that the interaction of FIG. 4 can take place without any additional heating, or the like, being required.

In the various general forms of the present invention the toroidal plasma ring structures, for example, the plasma rings 29 of FIG. 2, collide inside the magnetic field or bottle. The interaction caused by the collision generates a "septum region" consisting of a magnetic barrier which serves to separate the two plasma ring structures and keeps them from interacting in a way that would destroy them. This barrier of septum plays a key role in the operation of the device. It not only serves to keep the plasma rings from annihilating each others during compression to high temperatures and densities but serves as a screen which allows collision of fast ions at the center of the region between the structures while the electrons follow the magnetic field lines of the barrier and are shunted back into the structures.

Figure 4:
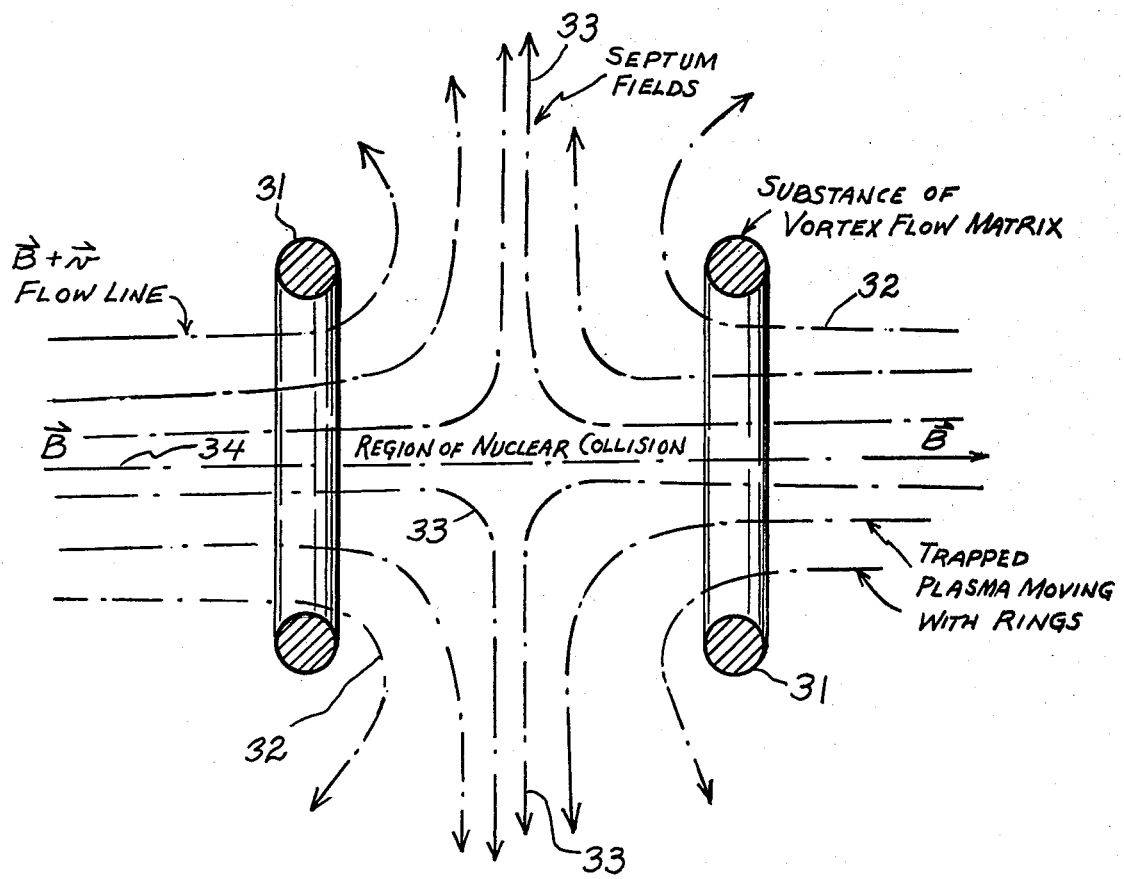
FIG. 4 is a diagrammatic representation in the form of a longitudinal cross-sectional view through a pair of adjacent plasma rings, said view being taken on the common axis of the rings, in a thermonuclear system according to the present invention, illustrating the collision of two of the lowest energy matrices or structures inside the magnetic guide field or bottle, representing a special case in which most of the energy is energy of motion and not thermal energy.

FIG. 2 is very general, merely showing a method of generation of the vortex rings. FIG. 4 shows a special case illustrating the collision of two of the lowest-energy matrices or structures 31, 31 inside the magnetic guide field or bottle. The structures 31, 31 may or may not have an appreciable portion of their energy in the form of trapped kinetic energy of motion. The plasma 32 trapped and moving with the vortex core of the rings and/or the plasma "peeled off" from the ring structures themselves collide at the center of the "septum region", as shown at 33, and produces the required fusion reaction. In the case described here, the rings are contained primarily by hydrodynamic forces and Lorentz or electrical forces play a minor role. The whole process must take place inside a guiding magnetic field 34.

FIG. 4 shows a very special but important case in which most of the energy is energy of motion and not thermal energy. The actions of the rings 31 and septum in this case is to allow the stored kinetic energy of the ions in the rings to be directed into a collision between the rings, as above described. The septum geometry allows the rings to act as kinetic energy storage rings and then allows and directs ion collisions in the region between the rings. (This is similar to energy storage rings in an accelerator system).

FIGS. 5a and 5b illustrate preferred vortex configurations, mainly for the purpose of preventing generation of X-rays. As previously stated, where most of the energy pumped into the rings is in the form of thermal energy, the rings may each consist of one large ring containing several smaller rings which circulate about inside them, helping in the containment of the high pressure gas inside the rings and reducing the energy required to produce the magnetic fields necessary for containment. The composite vortex ring structure, with plasma multiple-ring rotary motion as illustrated, allows hydromagnetic as well as electromagnetic confinement of the hot reacting plasmas. The composite internal interaction of the rings allows cold plasma to be drawn into the core of the vortex. Any electrons heated by the hot, fast-moving heavy ions transfer their energy to this cold gas and do not reach high temperatures. Since the electrons never become hot, there is no generation of bremsstrahlung and consequent loss of energy from the plasma. The energy is instead used to heat the plasma. The fact that the electrons remain cold also means that impurity radiation losses are effectively reduced to zero, thus eliminating the need for special equipment to remove impurities from the discharge. (Hot electrons are always cooled by surrounding neutral gas. The cross section of the interaction is relatively very large. The energy either ionizes the gas or kicks electrons into higher energy shells. In the latter case the energy is lost as radiation.)

The present invention achieves the objects previously set forth herein due to the fact that a naturally occurring self-ordering plasma structure results from the construction of an apparatus or machine of several possible geometries which allows the plasma to automatically form the uniquely stable and advantageous composite configuration described above. This allows the construction of a simple efficient and economically viable thermonuclear reactor.

A second inherent advantage of the method of the invention is that the closed plasma structure is inherently the most stable attainable by any presently known method or technique.

A third and most important advantage of the invention is that the structure is more easily heated by known methods than previously available structures. The unique interaction of two of these plasma structures brings them to rest and thus allows the application of heating devices to the rings or structures in order to further heat or compress them. As shown in FIG. 4 of the drawings, the energetic ring structures can "peel off" in layers of high velocity nuclei which collide in the region between the rings marked "septum fields", resulting in thermonuclear fusion of the nuclei even though the rings themselves may or may not have an appreciable amount of their energy in thermal energy, that is, most of it may be in the form of kinetic energy.

A fourth advantage of the invention is that the structures automatically employ hydrodynamic flow forces to contain the high pressure reacting plasma.

A fifth advantage of the invention is that the unique plasma structure does not radiate bremsstrahlung and/or synchrotron radiation in any appreciable amounts. This is due to the action of the layered magnetic field and flow structure which allows collision between ions but inhibits collision between ions and electrons. The fact that most of the ring energy may be in directed motion and not in thermal motion also inhibits the generation of bremsstrahlung.

A sixth important advantage of the invention is that the suppression of radiation from the reacting plasma allows the spiking of the discharge with heavy gaseous elements such as argon, which, because of the fact that their mass is considerably higher than that of hydrogen isotopes, automatically stabilizes the structure. It can be shown that mass flow along the magnetic field stabilizes the structure. The force free collinear structures described herein have mass flow along the field lines.

A seventh advantage of the invention is that the force free collinear flow described above has mass stabilization of the structure which automatically makes it more stable than a hydrostatic force free structure or any other hydrodynamic vortex structure, such as a Hill vortex, because the unique combination of the force freeness (zero Lorentz force) and collinear mass flow is required in order to have a minimum free energy structure. A magnetohydrostatic force free structure or a magnetohydrodynamic vortex structure such as the Hill vortex and/or any other flow structure, such as a toroidal structure with a reversed field on the outer layers of the torus, are automatically not as stable as the force free collinear structure herein described.

An eighth advantage of the invention is that the structure may or may not be a field reversing structure in that a reverse field configuration is not really required to obtain the objectives of this invention, but a reversed field configuration is not incompatible with this invention. In either case, end losses from the machine are suppressed, e.g., it is a closed configuration in either case.

A ninth advantage of the invention is that the structure is easy to produce by methods well known in the art, resulting in simplicity of reactor design, and in the design of either a large or a small reactor as need dictates.

A tenth inherent advantage of the invention is that the composite nature of the plasma ring structure (rings within rings rolling on each other) allows a large current bearing shell to form in the matrix. This shell provides some of the pressure necessary to hold the very hot dense plasma in and around the rings. This current shell would normally be unstable, but the circulating stable vortex structures within the matrix stabilizes the shell, which can in turn exert high pressure on the gas within the plasma ring by interacting with the magnetic fields produced within the ring and by the compression and/or guide fields.

An eleventh advantage of the invention is that the composite nature of the ring structure allows large Magnus (hydrodynamic) forces to be generated within the matrix. The forces act to exert high pressures on the hot gases in the rings.

It is to be understood that part or all of the Lithium or FLIBE blanket can be replaced by $238_U$ and/or $232_{Th}$ (Uranium 238 and/or Thorium 232) to provide for neutron capture in fertile material in order to produce fissile fuel, namely, $239_{Pu}$, $233_U$ (Plutonium 239, Uranium 233) for use in fission reactors. Part of the blanket may consist of actinides (Radioactive Wastes) to be processed by the neutron flux. The blanket, under these circumstances, may or may not produce heat energy for use in generating electricity.

While certain specific embodiments of improved thermonuclear fusion reactors have been disclosed in the foregoing description, it will be understood that various modifications within the scope of the invention may occur to those skilled in the art. Therefore it is intended that adaptations and modifications should and are intended to be comprehended within the meaning and range of equivalents of the disclosed embodiments.

What is claimed is:

1. A method of heating and compressing plasma comprising the steps of confining the plasma in a vacuum chamber, generating a primary containment magnetic field within and surrounding said vacuum chamber, inductively energizing said plasma to generate ringlike plasmoids moving toward collision with each other in the chamber along an axis extending in a direction parallel to said magnetic field, said primary magnetic field acting to constrain and guide said plasmoids along said axis, and additionally compressing said plasmoids as they approach collision.

2. The method of claim 1, and wherein said ringlike plasmoids are plasma vortex structures with relatively low free energy.

3. The method of claim 1, and wherein most of the energy in the plasmoids is in the form of kinetic energy of motion.

4. The method of claim 1, and wherein the additional compression of the plasmoids is obtained by generating a secondary magnetic field acting on said plasmoids along said axis.

5. The method of claim 1, and wherein the inductive energization of said plasma is obtained from electrical current rings coaxial with said chamber and coaxial with and surrounded by said primary containment magnetic field.

6. The method of claim 1, and wherein the plasmoids are in the form of composite vortex structures consisting of one large ring containing several small rings circulating about in the large ring.

7. The method of claim 6, and wherein cold plasma is allowed to be drawn into the cores of the vortex structures so that any electrons heated by hot, fast-moving ions transfer their energy to the cold plasma and there is substantially no generation of bremsstrahlung.

8. Apparatus for heating and compressing plasma comprising a vacuum chamber, means for generating a primary containment magnetic field within said vacuum chamber, means for generating plasma and confining said plasma in said vacuum chamber, means forming plasmoids in said chamber having a plasma configuration in which plasma mass flow in the chamber is predominantly along an axis extending in a direction parallel to said containment magnetic field, said plasmoid-forming means being located inside of and being surrounded by said magnetic field and including means for urging the plasmoids toward collision with each other to compress the plasmoids and elevate the plasma temperature, and means to further compress and heat the colliding plasmoids to further elevate the plasma temperature.

9. The plasma heating and compressing apparatus of claim 8, and wherein said plasmoid-forming means comprises respective pinch coils surrounding opposite ends of said vacuum chamber and being coaxially contained within said primary containment magnetic field.

10. The plasma heating and compressing apparatus of claim 8, and wherein said plasmoid-forming means comprises spaced current-carrying rings mounted coaxially with said chamber and being coaxially contained within said primary containment magnetic field.

11. The plasma heating and compressing apparatus of claim 8, and wherein said plasmoids are in the form of plasma vortex structures having relatively low free energy.

12. The plasma heating and compressing apparatus of claim 8, and wherein said further compression and heating means comprises secondary magnetic field generating means coaxially contained within said primary containment magnetic field.

13. The plasma heating and compressing apparatus of claim 12, and wherein said secondary magnetic field generating means comprises respective spaced coils surrounding said chamber.

14. The plasma heating and compressing apparatus of claim 13, and wherein said spaced coils are located adjacent the respective opposite ends of the chamber.

15. The plasma heating and compressing apparatus of claim 8, and a blanket layer mounted on and surrounding said vacuum chamber, said blanket layer comprising a material which converts the kinetic energy of the neutrons produced by the thermonuclear action within the chamber into heat energy.

16. The plasma heating and compressing apparatus of claim 8, and a blanket layer mounted on and surrounding said vacuum chamber, said blanket layer including material capable of neutron capture to produce fissile fuel which can be used in fission reactors.

17. The plasma heating and compressing apparatus of claim 8, and a blanket layer mounted on and surrounding said vacuum chamber, said blanket layer including actinides (radio active wastes) for processing by the neutron flux.

* * * * *